United States Patent [19]
Petrillo et al.

[11] Patent Number: 5,550,377
[45] Date of Patent: Aug. 27, 1996

[54] TECHNIQUE FOR BALANCING ANGER CAMERAS USING AN EXTERNALLY IRRADIATED CRYSTAL AND SINGLE TUBE DATA

[75] Inventors: Michael J. Petrillo, Twinsburg; Steven E. Cooke, Brecksville; Frank C. Valentino, Solon, all of Ohio

[73] Assignee: Picker International, Inc., Highland Heights, Ohio

[21] Appl. No.: 309,082

[22] Filed: Sep. 20, 1994

[51] Int. Cl.$^6$ .............................. G01T 1/161; G01T 1/208
[52] U.S. Cl. .................................. 250/363.09; 250/252.1; 250/369
[58] Field of Search ........................ 250/252.1 A, 363.09, 250/369, 252.1 R

[56] References Cited

U.S. PATENT DOCUMENTS

| | | | |
|---|---|---|---|
| 4,517,460 | 5/1985 | Meulenbrugge et al. | 250/252.1 |
| 4,583,187 | 4/1986 | Stoub | 364/571 |
| 4,605,856 | 8/1986 | Persyk et al. | |
| 4,764,678 | 8/1988 | Yamakawa | 250/369 |
| 4,857,722 | 8/1989 | Kumazawa et al. | 250/363.09 X |
| 4,882,495 | 11/1989 | Tanaka | 250/363.09 |
| 5,004,904 | 4/1991 | Yamakawa et al. | 250/369 X |
| 5,023,449 | 6/1991 | Holenka et al. | 250/252.1 R |
| 5,171,986 | 12/1992 | Loomis et al. | 250/252.1 R |
| 5,237,173 | 8/1993 | Stark et al. | 250/369 X |
| 5,360,975 | 11/1994 | Stoller | 250/369 X |

OTHER PUBLICATIONS

"NaI(T1) Camera Crystals: Imaging Capabilities of Hydrated Regions on the Crystal Surface", Keszthelyi–Lándori, Radiology 1986; 158:823–826.

"Automatic Gain Control For Radiation Detection Systems", Gilland, et al. pp. 277–282.

"The Technical Edge Nuclear Medicine Gamma Camera Systems", Siemens Medical Systems, Inc. Nov. 1985, pp. 1–27.

*Primary Examiner*—Carolyn E. Fields
*Assistant Examiner*—Edward J. Glick
*Attorney, Agent, or Firm*—Fay, Sharpe, Beall, Fagan, Minnich & McKee

[57] ABSTRACT

To calibrate a nuclear camera, the scintillation crystal (10) is irradiated with a uniform flood source (34). Scintillation events cause corresponding electrical pulses from photomultiplier tubes (12) that are optically coupled to the scintillation crystal. A selection circuit (40) compares (42) the amplitude or energy of pulses at each coordinate with a median energy and divides the pulses to generate a higher energy image (44) and a lower energy image (46). When the higher and lower energy images are subtracted (50) regions of the difference image (52) with high count densities identify a photomultiplier tube for gain adjustment. A gain adjustment circuit (60) monitors the amplitude of the electrical pulses and the number of pulses with each amplitude from the selected photomultiplier tube to generate a raw data energy distribution curve (FIG. 3). The energy distribution curve is smoothed (70) and the first derivative is taken (72). The curve is filtered (74) to isolate a preselected energy region. The curve is analyzed (92) to determine an energy value corresponding to a centroid (94) of the filtered first derivative curve. The centroid energy value is compared (96) with the centroid energy value from a preprogrammed table (32). The deviation between the calculated and looked-up centroid energy addresses a look-up table (98) which retrieves the appropriate adjustment to the selected photomultiplier tube. Each adjustment of the photomultiplier tube is stored in a gain adjustment history memory (110).

16 Claims, 5 Drawing Sheets

5,550,377

TECHNIQUE FOR BALANCING ANGER CAMERAS USING AN EXTERNALLY IRRADIATED CRYSTAL AND SINGLE TUBE DATA

BACKGROUND OF THE INVENTION

The present invention relates to the automatic calibration and adjustment of medical diagnostic imaging equipment. It finds particular application in conjunction with balancing photomultiplier vacuum tubes used in conjunction with Anger or nuclear cameras and will be described with particular reference thereto.

An Anger or nuclear camera commonly includes a scintillation crystal which emits flashes of light or scintillations in response to incident radiation. Typically, the scintillation crystal is on the order of 20 to 40 cm. by 40 to 80 cm. A multiplicity of vacuum photomultiplier tubes are arranged in a close packed hexagonal array. Typically, the Anger or nuclear camera includes a few dozen photomultiplier tubes. Each photomultiplier tube responds to each scintillation within its field of view by producing an electrical pulse. Typically, each scintillation is viewed directly by a plurality of surrounding photomultiplier tubes and indirectly as scattered light by more distant tubes. Each photomultiplier tube responds to each viewed scintillation by producing an electrical pulse whose magnitude is proportional to the brightness of the scintillation. The relative magnitude of the signals from the photomultiplier tubes viewing a scintillation is indicative of the relative distance of the scintillation from each photomultiplier tube. The sum of the magnitudes from all tubes viewing a common scintillation is indicative of the energy of the radiation. The electrical pulses from the photomultiplier tubes are processed, as known in the art, to provide an indication of the coordinates on the scintillation crystal at which each scintillation occurred and to reconstruct this information into medical diagnostic images.

It is to be appreciated that the magnitude of the electrical pulse signals from the photomultiplier tubes is determined not only by the distance of the scintillation from the photomultiplier tube and the energy of the radiation, but also by the gain of the photomultiplier tube. During manufacturing, a matched set of vacuum tubes are selected for each camera, i.e., vacuum tubes which have substantially the same gain. During manufacturing and initial calibration, the gain of the photomultiplier tubes is precisely adjusted or balanced individually. However, photomultiplier tubes, like other vacuum tubes, undergo a change in characteristics with use, e.g., an age related reduction in gain. Some vacuum tubes, known as "flyers", have a gain which increases with age rather than decreasing. The change in characteristics varies from tube to tube such that the set of photomultiplier tubes that were precisely balanced during manufacturing need periodic rebalancing.

Typically, Anger or nuclear cameras undergo a daily start-up procedure which checks various calibrations and adjustments of the camera. One part of this procedure includes to place a uniform flood source, e.g., a radioactive isotope vial or sheet in a position where it irradiates the entire surface of the scintillation crystal uniformly. The photomultiplier tubes view the scintillations and generate a resultant image. If the camera is in proper adjustment, the resultant uniform flood image is a uniform image of constant color and intensity. Variations in the color or intensity are indicative of various adjustment and calibration errors in the camera. Errors in the relative gain of the photomultiplier tubes manifest themselves in bright spots under tubes whose gain is higher than the other tubes and dark spots under tubes whose gain is lower than the other tubes. Typically, the photomultiplier tube gain can become several percent out of balance before there is a human-noticeable difference in the intensity of the uniform flood image.

Various techniques have been developed for calibrating the photomultiplier tube gain. In one technique, an LED of fixed intensity is mounted adjacent the photomultiplier tubes to bounce light off or through the crystal. The high voltage supplied to each photomultiplier tube is adjusted to adjust their relative gain. See, for example, U.S. Pat. No. 4,605,856. One drawback of this technique is that variations in the optical coupling between the LED and the scintillation crystal cause errors in the resultant gain adjustment. In a related technique, the LED is incorporated into each photomultiplier tube where the optical coupling is more highly controlled. Incorporating the LED in the photomultiplier tube is expensive. Moreover, the light output of LEDs is temperature variant.

In another technique, an aperture plate is disposed between the uniform flood source and the scintillation crystal. One of the holes in the plate is centered on each of the photomultiplier tubes. The photomultiplier tubes are individually selected to count radiation events for a preselected duration. Each tube is then adjusted until the counts are substantially uniform. See, for example, U.S. Pat. No. 4,517,460. One of the difficulties of this technique is that a very large count is required for statistical accuracy. This requires a test fixture and a long calibration time on the order of hours.

In another technique, the output of the photomultiplier tubes is monitored whenever the camera is in operation to determine a continuously updated energy response vector. The energy response vector is multiplied by a deconvolution matrix to deconvolve the contribution of adjoining tubes. The deconvolution matrix is the inversion of a contribution matrix containing matrix elements which represent the relative contribution of each radiation detector of the system. See, for example, U.S. Pat. No. 4,583,187. One drawback to this technique is that the gain adjustment is always on. Adjustments in gain can be made during a patient examination and are subject to statistical variations. Adjustments vary with conditions. Another drawback is that all nearest neighbors contribute. There is no individual tube selection.

The present invention contemplates a new and improved photomultiplier tube gain adjustment technique which overcomes the above-referenced problems and others.

SUMMARY OF THE INVENTION

In accordance with one aspect of the present invention, the photomultiplier tubes are exposed to a uniform flood source and their output monitored for a relatively short duration to determine an energy distribution response curve. From the factory calibration, a priori energy distribution information is known for each tube. From this a priori energy distribution information, a region of the response curve of each tube is identified and analyzed in accordance with the a priori energy distribution information.

In accordance with a more limited aspect of the present invention, a peak in the energy distribution response curve is isolated and enhanced preferably differentiating the response curve and convolving with a region of interest limiting Gaussian or other filter.

In accordance with another more limited aspect of the present invention, a split window technique is used to identify the photomultiplier tubes to be calibrated. Two images of the flood source are generated—one with scintillation events above a selected median energy and one with scintillation events below the median energy. Two images are subtracted to create a difference image, which is analyzed for high positive and negative count regions.

In accordance with another aspect of the present invention, the calibration technique is performed automatically and the gain of out-of-adjustment tubes is adjusted automatically. Each time an adjustment is made, a record of the adjustment is kept. The recorded gain adjustments are analyzed and failing tubes are flagged. Tubes which are flagged for replacement may include, for example, erratic tubes where the gain continually fluctuates, flyer tubes where the gain is continually increasing, aging tubes whose gain is approaching a lower window of acceptability, and the like.

One advantage of the present invention is that it identifies and adjusts the gain of photomultiplier tubes accurately and automatically.

Another advantage of the present invention is that it identifies failing tubes before the tube fails or degrades to a point at which replacement is mandatory.

Another advantage of the present invention resides in its invisibility to the user. Adjustments are made and tubes are flagged and replaced with no input or inconvenience to the user.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
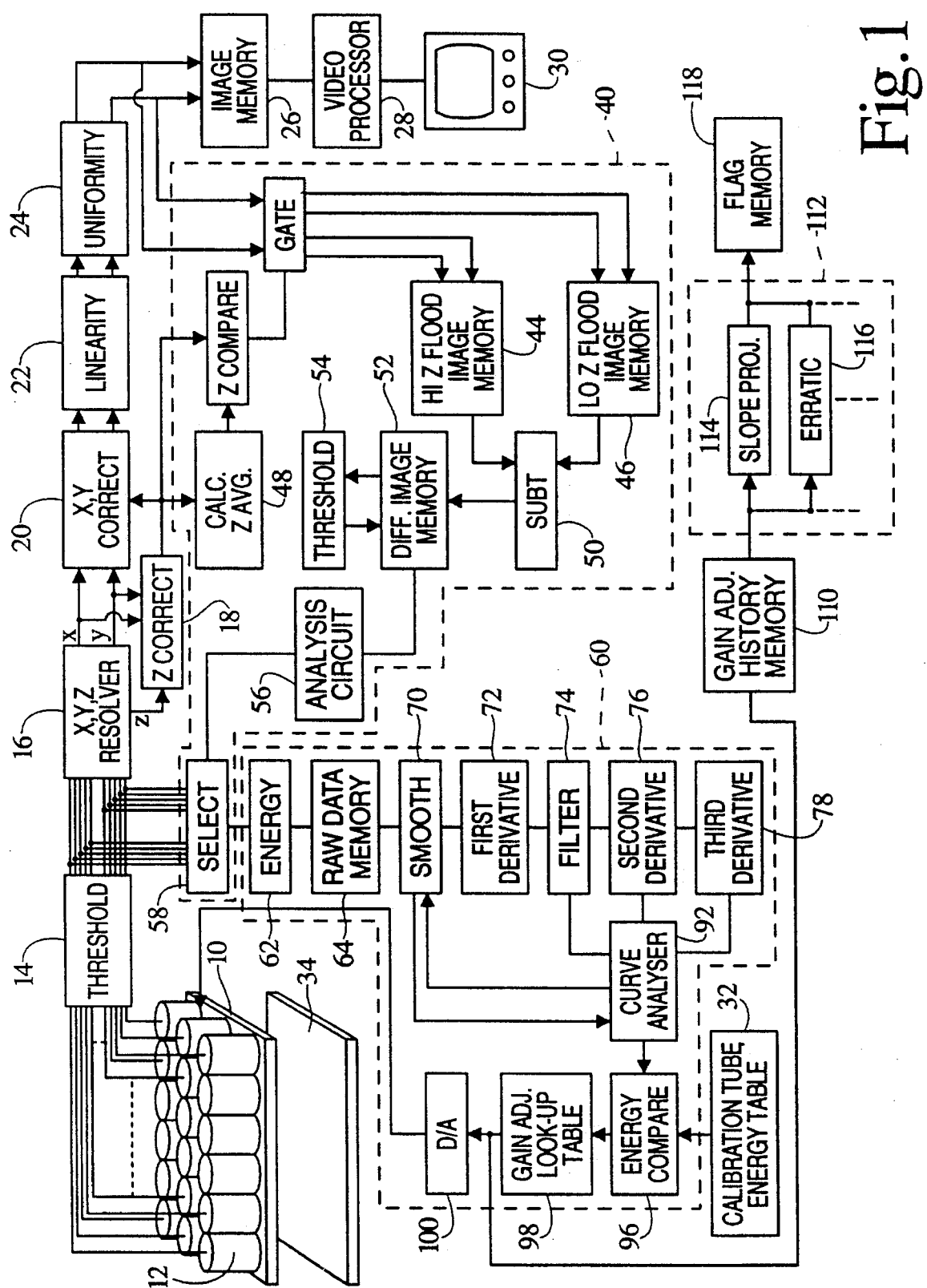
FIG. 1 is a diagrammatic illustration of a nuclear camera in accordance with the present invention.

With reference to FIG. 1, the Anger or nuclear camera includes one or more detector heads each having a scintillation crystal 10 to which a plurality of photomultiplier tubes 12 are optically coupled. Each of the photomultiplier tubes has an adjustable gain. Gain can be adjusted by adjusting a grid potential, by adjusting a separate amplifier connected to an output of each photomultiplier tube, or the like. Each time radiation impacts the scintillation crystal, it produces a light flash or scintillation event. Those photomultiplier tubes which view the light flash generate a corresponding electrical pulse.

A threshold circuit 14 discards electrical pulses below a preselected minimum height such that only the response from photomultiplier tubes immediately adjacent a scintillation are retained. A resolver 16 determines the coordinate locations on the scintillation crystal, commonly denoted the x and y-coordinates, at which each scintillation takes place and the energy or z-value of each scintillation. The photomultiplier tubes do not respond uniformly to all spatial locations and energies. In general, a photomultiplier tube is most responsive to scintillations directly over itself. A first correction circuit 18 corrects the energy or z in accordance with spatial correction. A second correction circuit 20 corrects spatial position in accordance with energy. A linearity correction 22 corrects the apparent x,y-coordinate events for inherent non-linearities in the system. A uniformity correction circuit 24 corrects for the larger number of events that are recorded centrally under tubes and the lesser number of events that are recorded between tubes. After correction, the number of scintillation events occurring at each corrected x, y-position on the scintillation camera are summed at a corresponding address in an image memory 26. A video processor 28, or the like, converts the number of counts corresponding to each x, y-position into appropriate gray scale or color for display on a video monitor 30 or other human-readable display.

During initial manufacturing, the gain of each photomultiplier tube is calibrated and adjusted. From the calibration procedure, the centroid of each photomultiplier tube and a characteristic edge value marking the edge of each photomultiplier tube are determined and stored in a centroid and characteristic edge value table 32. Thereafter, preferably during daily setup and calibration, a uniform flood source 34 is disposed to irradiate the scintillation crystal 10 uniformly. The tube output signals from the uniform flood source are processed into a flood image representation in the image memory 26. A photomultiplier tube selection circuit 40 analyzes the uniform flood image to determine "hot" spot or "cold" spots indicative of regions in which an abnormally high or low, respectively, number of radiation events appear to have occurred. Hot spots are indicative of a region overlaid by a photomultiplier tube whose gain is too high and cold spots are indicative of a photomultiplier tube whose gain is too low.

The amplitude or energy of the pulses from the photomultiplier tubes which are processed into counts in the image memory 26 fall in a narrow range, typically, a narrow Gaussian function. If all of the tube gains are perfectly balanced, the center of all the Gaussian energy distributions is the same. However, if the gain on a tube is high, the Gaussian energy distribution of counts in coordinates under it will be shifted to a higher energy; if the gain is low the Gaussian energy distribution of counts in coordinates under the tube will be shifted to a lower energy. A comparator 42 compares the z-value of each scintillation event with a preselected energy value, specifically the average energy. If the energy value is above the preselected energy, the count at the corresponding coordinate in a high energy flood correction image memory 44 is incremented. If the energy value is below the preselected energy, the count at the corresponding coordinate in a low energy flood correction image memory 46 is incremented. An average energy calculating means 48 calculates the average energy of all radiation events which contribute to the flood image. To expedite the energy sorting, the preselected energy is the average energy from the flood image of the prior day. An image substraction circuit 50 subtracts the spatially corresponding counts of the high and low energy flood images to create a difference image which is stored in a difference image memory 52. Under photomultiplier tubes with balanced gain, the difference image will have a zero or near-zero value. Under tubes whose gain need adjustment, the difference image will have a larger magnitude, with its sign indicating whether the gain is high or low. A threshold circuit 54 zeroes values in the difference image that are within a preselected acceptable tolerance of zero. An analysis circuit 56 analyzes the difference image for the highest and lowest (or largest magnitude negative) counts relative to a normal or median count. The photomultiplier tube centered closest to the geographic center of a count region with the largest deviation from the normal or median count is selected for gain calibration.

Based on the analysis, a selection means 58, such as a multiplexer or series of gates, selects which of the photomultiplier tubes output pulse signals for gain adjustment. The photomultiplier tube(s) is connected with an automatic photomultiplier tube gain adjustment circuit 60.

Figure 2:
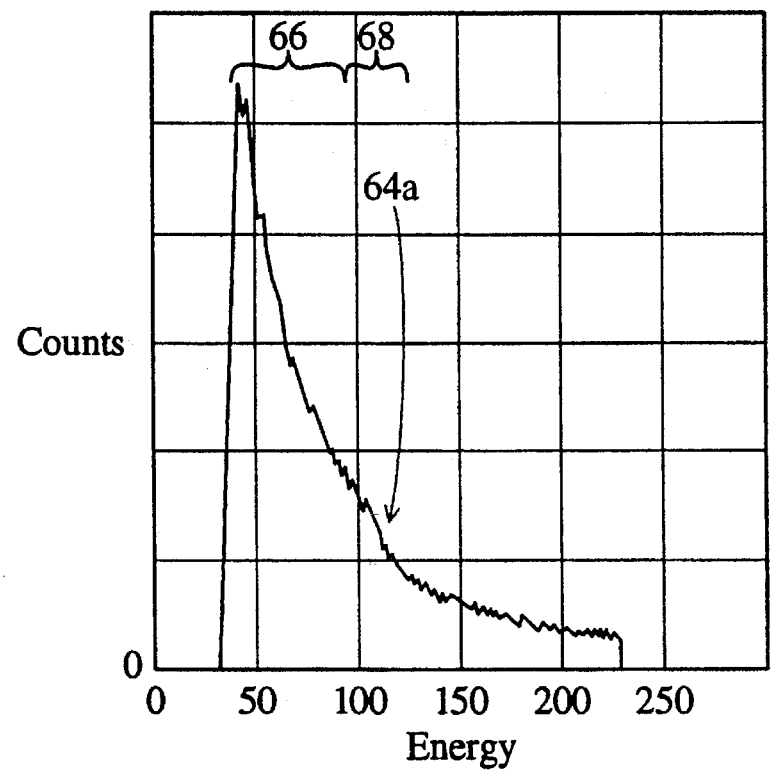
FIG. 2 illustrates a number of scintillation events versus event energy distribution curve of a typical photomultiplier tube as is recorded in the raw data memory of FIG. 1.

While the uniform flood source 34 is flooding the scintillation crystal 10, an energy circuit 62 determines the energy or amplitude of each pulse from the monitored photomultiplier tube. A raw data memory 64 stores a count of a number of pulses with each energy to develop an energy distribution plot or curve 64a for the selected photomultiplier tube. FIG. 2 illustrates an exemplary energy distribution curve as stored by the raw data memory 64. In FIG. 2, the counts with energy in region 66 are primarily from scintillation events which are displaced from the selected photomultiplier tube and scattered light. Each photomultiplier tube sees scintillations under near neighbor tubes with a diminished intensity. Counts around a region 68 correspond to scintillation events occurring substantially over the center of the photomultiplier tube. It should be remembered that the energy as determined by the energy circuit 62 is a function of both the brightness of the scintillation (hence the proximity to the center of the photomultiplier tube) and the gain of the photomultiplier tube. As the gain is increased, the energy of the scintillation events occurring directly under the photomultiplier tube as determined by the circuit 62 increase, although the brightness of the scintillations, of course, remains the same. Because photomultiplier tubes tend to be most sensitive to scintillation events directly under themselves, if the data were sampled for a sufficiently long duration, a small identifiable peak would develop in the FIG. 2 data. However, as shown in FIG. 2 and the enlargement of FIG. 3, at the low counts which are achieved in the time available during a daily setup and calibration, any such peak is buried below the more prominent statistical or random variations.

Figure 3:
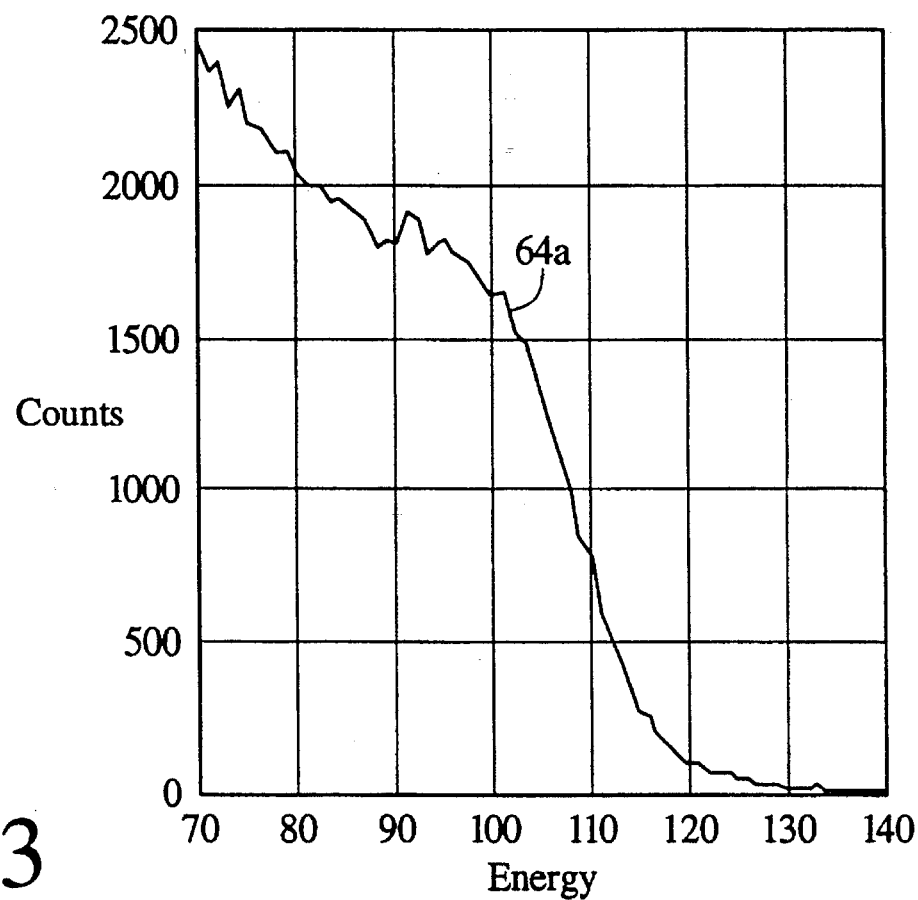
FIG. 3 is a portion of the energy distribution curve of a typical photomultiplier tube adjacent a region of interest.
Figure 4:
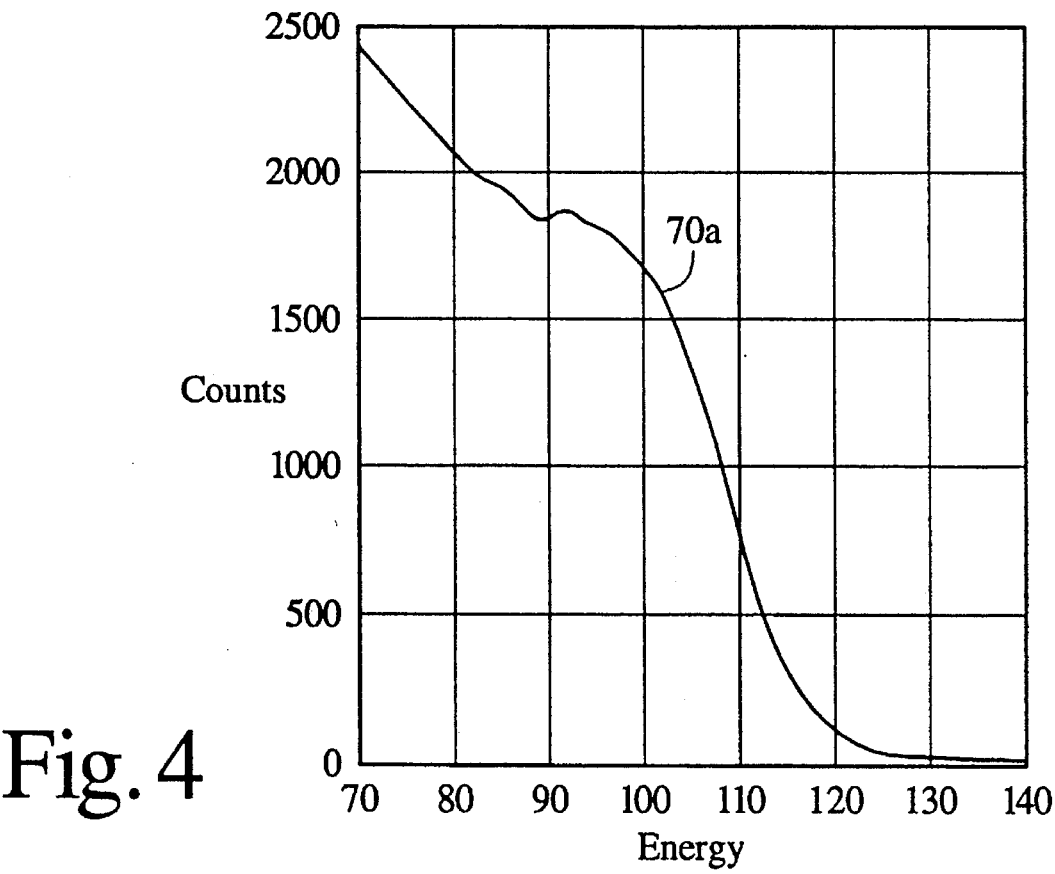
FIG. 4 illustrates the energy distribution curve of FIG. 3 after smoothing.
Figure 5:
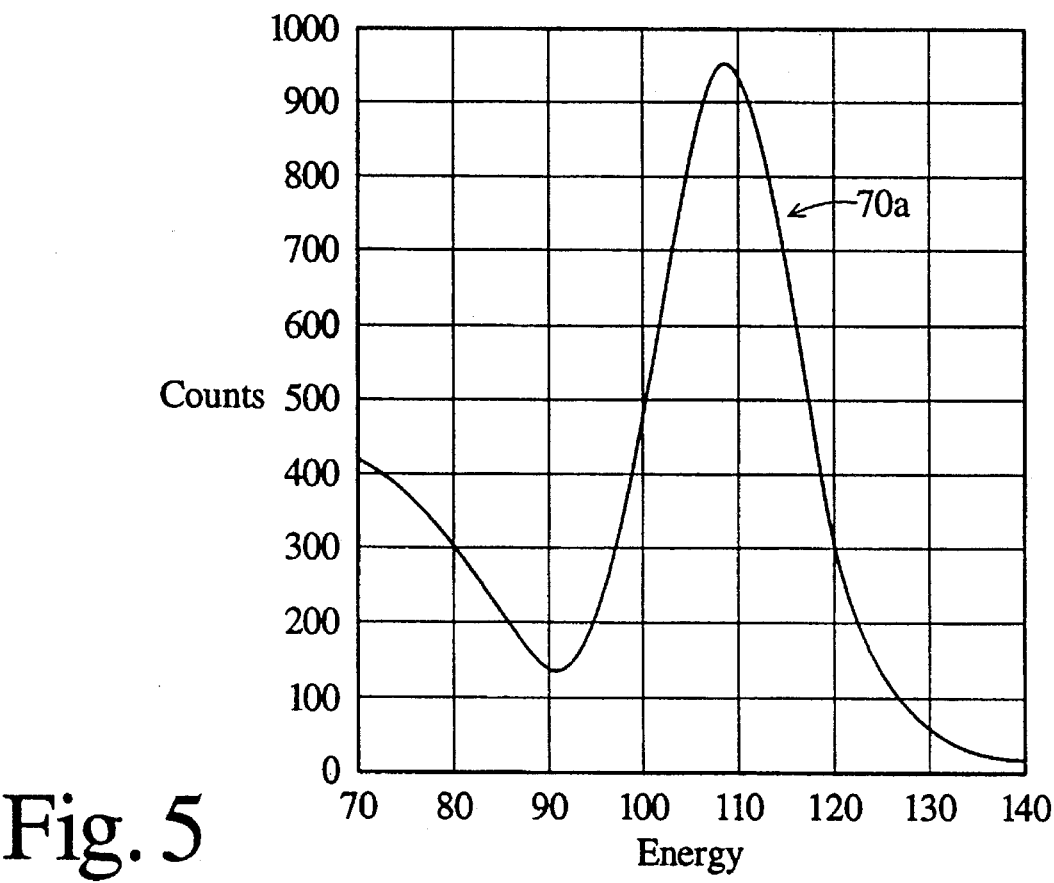
FIG. 5 illustrates the first derivative of the smoothed energy distribution curve of FIG. 4.
Figure 6:
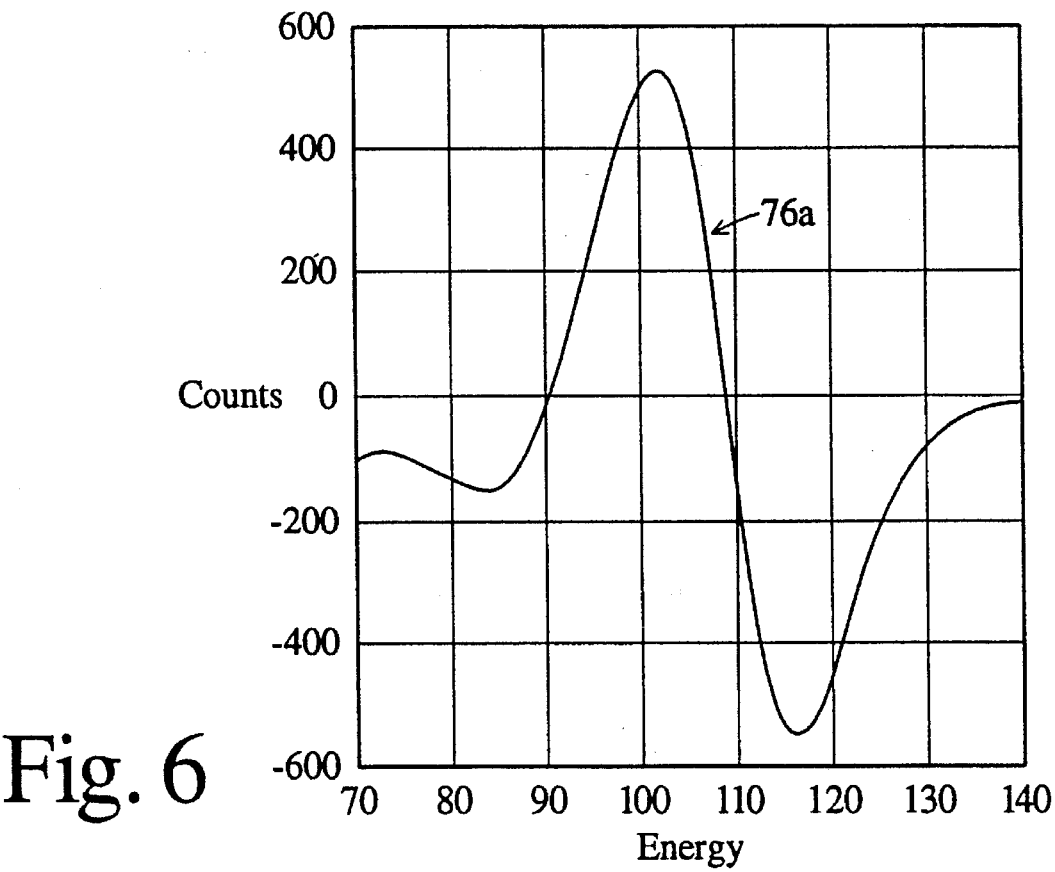
FIG. 6 illustrates the second derivative of the energy distribution curve.
Figure 7:
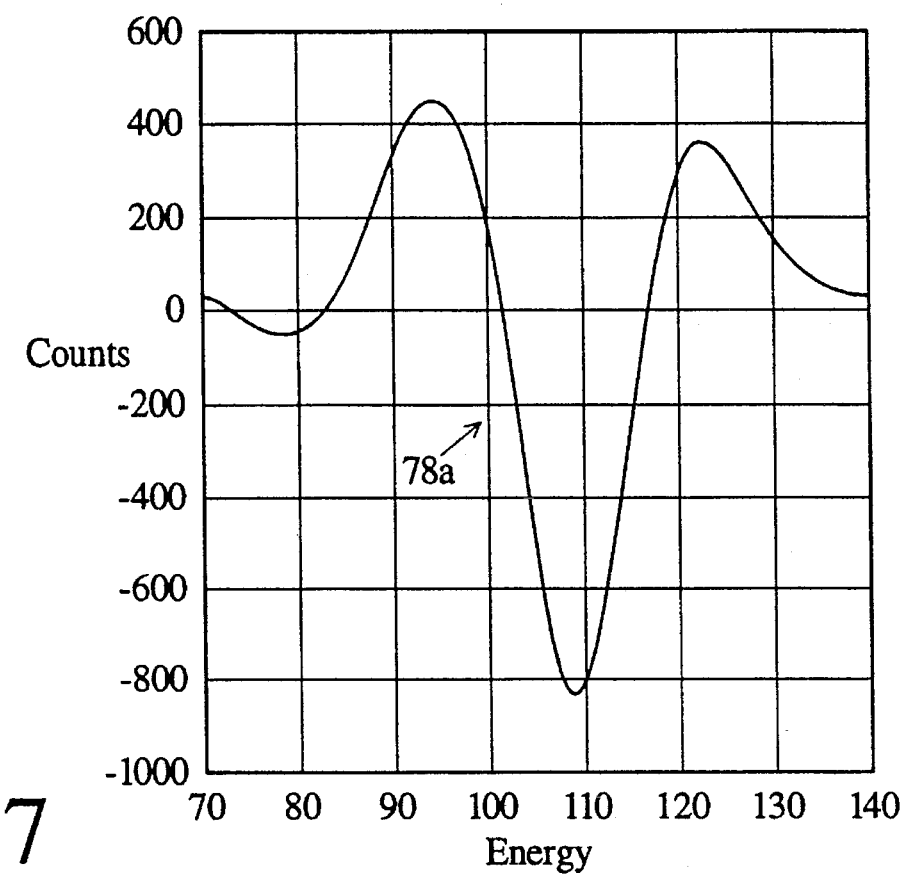
FIG. 7 illustrates the third derivative of the energy distribution curve.

A smoothing circuit 70 smooths the FIG. 3 raw energy distribution curve 64a into a smoothed energy distribution curve 70a as illustrated in FIG. 4. In the preferred embodiment, the smoothing circuit 70 averages the count at each energy level with the counts at adjoining energy levels. That is, the count for each energy level is replaced with a weighted average of its own count and the counts of surrounding energy levels. In the preferred embodiment, a 9-point smoothing function is utilized. A first derivative circuit 72 takes the first derivative of the smooth energy distribution curve 70a of FIG. 4. Filter circuit 74 filters the energy distribution curve adjacent the region of interest to eliminate data outside of the region of interest. In the preferred embodiment, the first derivative circuit 72 determines the first derivative using an 8-point difference routine. Other known mathematical algorithms for determining the slope or rate of change of the data are also contemplated. In the preferred embodiment, the filter circuit 74 convolves the first derivative curve with a Gaussian filter whose width is matched to the region of interest. For example, the width of the Gaussian may be matched to the width of the energy peak of the selected photomultiplier tube. Other filters which emphasize data in the region of interest and de-emphasize data outside the region of interest are also contemplated. The filtered first derivative curve 74a is illustrated in FIG. 5. A second derivative circuit 76 determines a second derivative curve 76a (FIG. 6) and a third derivative circuit 78 determines a third derivative 78a (FIG. 7).

Figure 8:
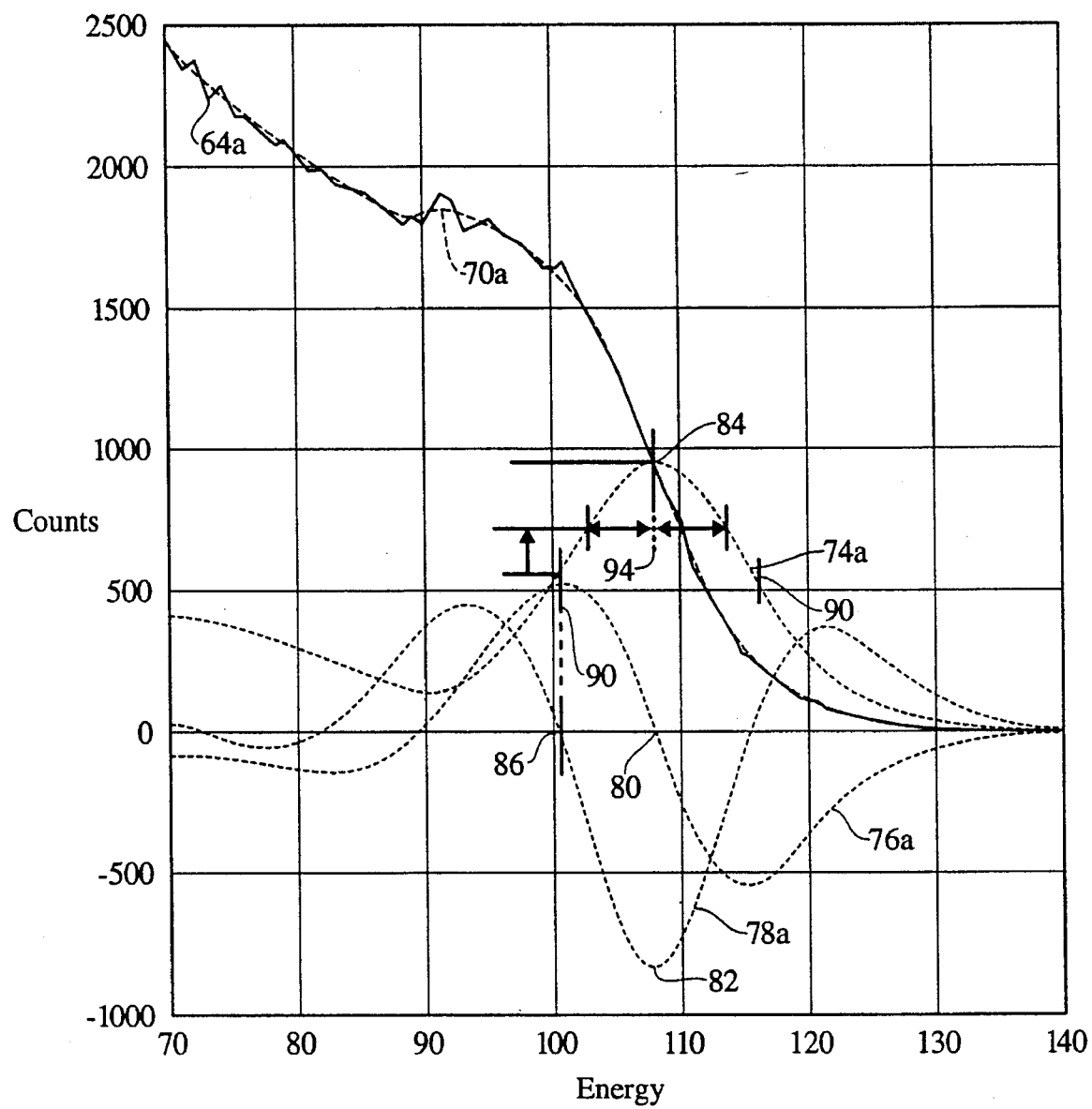
FIG. 8 is a superimposition of the curves of FIGS. 3–7.

With reference to FIG. 8, the second and third derivative curves isolate the proper peak of the smoothed energy distribution curve 70a. The center of the filtered first derivative curve 74a is coincident with a zero-crossing 80 of the second derivative curve 76a. The third derivative curve 78a has a peak 82 aligned with a first derivative peak 84 and the second derivative zero-crossing 80. The zero-crossing points 86 of the third derivative curve mark outer boundaries 90 for regions of the first derivative curve to be examined. A pulse analyzer 92 analyzes the shape of the first derivative peak between boundaries 90. More specifically, the pulse analyzer 92 reduces the analyzed portion of the first derivative peak by a predetermined percentage, e.g., 25% of the way up the first derivative curve 74a from the third derivative crossings boundaries 90 towards the peak 84. The pulse analysis circuit further determines a centroid 94 of the selected portion of the first derivative curve 74a. The curve analyzer 92 addresses the smoothed energy distribution curve memory 70 to retrieve the energy value corresponding to the centroid 94. Optionally, the pulse analysis circuit can retrieve and calculate a weighted average of the energy values corresponding to the selected portion of the first derivative peak emphasizing the energy nearest the centroid. A comparing circuit 96 compares the retrieved energy values from the smoothed energy distribution curve memory 70 with the centroid energy from the centroid and characteristic edge value table 32 to determine a deviation therebetween. The deviation therebetween is used to address a look-up table 98. The look-up table 98 converts the difference into a digital output which is conveyed to a digital-to-analog converter 100. The digital-to-analog converter converts the digital output of the look-up table into an analog potential which is applied to re-bias and adjust the gain of the corresponding photomultiplier tube. The exact values in the look-up table are determined experimentally in accordance with the photomultiplier tube selected and the duration over which flood source is monitored.

Each time an adjustment is made, an adjustment history memory 110 is enabled to store the amount of the adjustment, a designation of the adjusted tube, and the date of adjustment. An analysis circuit 112 analyzes the historical adjustment data in the adjustment history memory 110. Various historical data trends are monitored. For example, a slope projecting circuit 114 determines a rate of change and a direction of change of the gain of each tube. If the gain is increasing, the tube is designated as a "flyer" and flagged for replacement. Similarly, if the gain is decreasing and approaching the end of the acceptable gain window, then the tube is flagged for replacement. Analogously, an erratic adjustment monitor circuit 116 monitors the historical data to see if the gain requirements of any tube are fluctuating erratically. Erratic gain adjustments indicate that the tube is not staying in adjustment and it is again flagged for replacement. The flagged information is stored in a flagged information memory 118 which is accessed by the service personnel during periodically scheduled service visits. Optionally, the adjustment history memory and the flagged information memory may be connected with a telecommunications link to be remotely accessed by the service personnel or to contact a central service facility each time an event is flagged.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a nuclear camera including a scintillation crystal, a plurality of photomultiplier tubes with adjustable gain, a resolver for resolving coordinate position and energy of each scintillation event on the scintillation crystal, and an image memory, the improvement comprising:

a circuit which concurrently monitors an output signal of each of a plurality of selected photomultiplier tubes individually when the scintillation crystal is exposed to a uniform flood source;

a circuit for identifying each selected photomultiplier tube individually whose gain is out of adjustment; and an automatic photomultiplier tube gain adjustment circuit which individually adjusts each selected photomultiplier tube gain individually in accordance with the monitored output signals.

2. In the nuclear camera as set forth in claim 1, the photomultiplier tube identifying circuit including:

a first memory for accumulating a number of photomultiplier tube output pulses above a preselected energy corresponding to each spatial coordinate of the scintillation crystal to define a higher energy image;

a second memory for accumulating a number of photomultiplier tube output pulses below the preselected energy corresponding to each spatial coordinate of the scintillation crystal to define a lower energy image;

an image subtraction circuit for subtracting the higher and lower energy images to create a difference image;

a means for identifying photomultiplier tubes positioned closely adjacent to spatial coordinate regions of the difference image with large magnitudes.

3. In a nuclear camera including a scintillation crystal, a plurality of photomultiplier tubes with adjustable gain, a resolver for resolving coordinate position and energy of each scintillation event on the scintillation crystal, and an image memory, the improvement comprising:

a raw data memory which accumulates a number of photomultiplier tube output pulses from each of a plurality of selected photomultiplier tubes for each of a plurality of energy levels such that an individual energy distribution curve of pulse count versus energy is acquired for each selected photomultiplier tube individually;

a means for isolating a region of each energy distribution curve accumulated in the raw data memory corresponding to scintillation events occurring under each selected photomultiplier tube individually;

a means for comparing the energy in the isolated region of each energy distribution curve with preselected energy information; and, a means for adjusting the gain of each selected photomultiplier tube individually in accordance with the difference between the energy in the isolated region of its energy distribution curve and the preselected energy information.

4. In a nuclear camera including a scintillation crystal, a plurality of photomultiplier tubes with adjustable gain, a resolver for resolving coordinate position and energy of each scintillation event on the scintillation crystal, and an image memory, the improvement comprising:

an automatic photomultiplier tube gain adjustment circuit which monitors output signals of at least a selected photomultiplier tube when the scintillation crystal is exposed to a uniform flood source and adjusts the selected photomultiplier tube gain in accordance with the monitored output signals;

an adjustment history memory for storing gain adjustment information each time one of the photomultiplier tubes is adjusted; and, an analysis circuit for analyzing the gain adjustment history stored in the gain adjustment history memory to identify failing photomultiplier tubes for replacement.

5. A nuclear camera comprising:

a scintillation crystal;

a plurality of photomultiplier tubes optically coupled with the scintillation crystal, each of the photomultiplier tubes having an independently adjustable gain, the photomultiplier tubes each generating an electrical output pulse in response to light received from a scintillation event in which the scintillation crystal converts received radiation into a flash of light, an amplitude of the electrical pulse from each photomultiplier tube varying in accordance with a brightness of the received light and the gain of the tube;

an automatic gain adjustment circuit for monitoring the electrical output pulses from at least a selected one of the photomultiplier tubes when the scintillation crystal is exposed to a uniform flood source and adjusting the gain of the selected one of the photomultiplier tubes to standardize the electrical pulses from the photomultiplier tubes, the automatic gain adjustment circuit including:

a raw data memory which counts and stores a number of pulses with each of a multiplicity of amplitudes collected over a preselected duration that the scintillation crystal is exposed to the uniform flood source such that a count versus pulse amplitude energy distribution curve is derived;

a smoothing circuit for smoothing the energy distribution curve to generate a smoothed energy distribution curve;

a first derivative circuit for calculating a first derivative of the smoothed energy distribution curve to generate a first derivative curve;

a filter for filtering the first derivative curve to generate a filtered first derivative curve which emphasizes a preselected region of interest generally corresponding to a preselected pulse amplitude region;

a pulse analyzer for analyzing the filtered first derivative curve to identify a characteristic energy value;

a comparing circuit which compares the characteristic energy value from the pulse analyzer with a preselected energy value to determine a deviation therebetween;

a gain adjusting circuit for converting the deviation from the comparing circuit into a corresponding gain adjustment for the selected one of the photomultiplier tubes.

6. The nuclear camera as set forth in claim 5 wherein the pulse analyzer determines a centrally weighted average energy value for the region of interest of the filtered first derivative curve and wherein the comparing circuit compares the centrally weighted average energy value with a centrally weighted energy value determined during initial calibration.

7. The nuclear camera as set forth in claim 6 further including:

a second derivative circuit for determining a second derivative of the filtered first derivative curve to generate a second derivative curve; and a third derivative circuit for determining a third derivative curve from the second derivative curve, the pulse analyzer being connected with the second and third derivative circuits, a zero-crossing point of the second derivative curve corresponding substantially to an apex of the first derivative curve in the region of interest and a zero-crossing of the third derivative curve defining an outer boundary of the region of interest of the first derivative curve.

8. A nuclear camera comprising:

a scintillation crystal;

a plurality of photomultiplier tubes optically coupled with the scintillation crystal, each of the photomultiplier tubes having an independently adjustable gain, the photomultiplier tubes each generating an electrical output pulse in response to light received from a scintillation event in which the scintillation crystal converts received radiation into a flash of light, an amplitude of the electrical pulse from each photomultiplier tube varying in accordance with a brightness of the received light and the gain of the tube;

a resolver for resolving spatial coordinates and an energy of each scintillation event on the scintillation crystal, the resolver being connected with the plurality of photomultiplier tubes to receive the output pulses therefrom;

a means for separating spatial coordinate counts in accordance with energy such that counts above a preselected median energy are stored in a first flood image memory and counts below the preselected median energy are stored in a second flood image memory;

a means for subtractively combining counts stored in the first and second flood image memories for corresponding coordinates to generate a difference image;

an analyzing means for analyzing counts of the difference image for regions of high and low count densities and for identifying photomultiplier tubes corresponding to the high and low count densities;

an automatic gain adjustment circuit for adjusting the gain of photomultiplier tubes identified by the analyzing means to standardize the electrical pulses from the photomultiplier tubes.

9. A nuclear camera comprising:

a scintillation crystal;

a plurality of photomultiplier tubes optically coupled with the scintillation crystal, each of the photomultiplier tubes having an independently adjustable gain, the photomultiplier tubes each generating an electrical output pulse in response to light received from a scintillation event in which the scintillation crystal converts received radiation into a flash of light, an amplitude of the electrical pulse from each photomultiplier tube varying in accordance with a brightness of the received light and the gain of the tube;

an automatic gain adjustment circuit for adjusting a gain of selected photomultiplier tubes to standardize the electrical pulses from the photomultiplier tubes; and a gain adjustment history memory for storing a history of adjustments of the photomultiplier tubes.

10. The nuclear camera as set forth in claim 9 further including an adjustment history analysis circuit for analyzing the gain adjustment history stored in the gain adjustment history memory for identifying failing photomultiplier tubes and flagging such failing tubes for replacement prior to failure.

11. In a method of adjusting gain of photomultiplier tubes which are optically coupled to a scintillation crystal of a nuclear camera such that scintillation events in the scintillation crystal result in adjacent photomultiplier tubes generating output pulse signals, the improvement comprising:

exposing the scintillation crystal to a uniform flood source;

monitoring amplitudes of the output pulse signals of each of a plurality of selected photomultiplier tubes individually while the scintillation crystal is exposed to the uniform flood source;

determining an energy distribution representing (i) a number of pulses versus (ii) pulse amplitude for the photomultiplier tube output pulse signals individually for each selected photomultiplier tube;

isolating a preselected energy region of the energy distribution individually for each selected photomultiplier tube;

comparing an energy in the isolated energy region with preselected energy information individually for each selected photomultiplier tube; and adjusting the gain of each selected photomultiplier tube individually in accordance with the comparison between the isolated energy region of the energy distribution and the preselected energy information.

12. A method of adjusting gain of photomultiplier tubes which are optically coupled to a scintillation crystal of a nuclear camera such that scintillation events in the scintillation crystal result in adjacent photomultiplier tubes generating output pulse signals, the method comprising:

exposing the scintillation crystal to a uniform flood source;

monitoring output signals of at least a selected photomultiplier tube while the scintillation crystal is exposed to the uniform flood source;

determining an output signal distribution for the photomultiplier tubes and adjusting the gain of the selected photomultiplier tube in accordance with the distribution; and, each time a photomultiplier tube gain is adjusted, storing an identification of the photomultiplier tube, the gain adjustment, and date.

13. A photomultiplier tube gain adjusting method for adjusting gain of photomultiplier tubes which are optically coupled to a scintillation crystal of a nuclear camera such that scintillation events in the scintillation crystal result in adjacent photomultiplier tubes generating output pulse signals, the method comprising:

exposing the scintillation crystal to a uniform flood source;

monitoring amplitudes of the output pulse signals of the photomultiplier tubes while the scintillation crystal is exposed to the uniform flood source;

accumulating a number of photomultiplier tube output pulses above a preselected energy corresponding to each spatial coordinate of the scintillation crystal to define a higher energy image;

accumulating a number of photomultiplier tube output pulses below the preselected energy corresponding to each spatial coordinate of the scintillation crystal to define a lower energy image;

subtracting the higher and lower energy images to create a difference image;

selecting a photomultiplier tube positioned most closely adjacent to spatial coordinate regions of the difference image with large magnitudes for gain adjustment; and adjusting the gain of the selected photomultiplier tube.

14. A method of adjusting gain of photomultiplier tubes of a nuclear camera which has a scintillation crystal and a plurality of photomultiplier tubes optically coupled with the scintillation crystal, each of the photomultiplier tubes having an independently adjustable gain, the method comprising:

disposing a uniform flood source adjacent the scintillation crystal such that the scintillation crystal is irradiated with a uniform flood of radiation, radiation striking the scintillation crystal causing a scintillation event, photomultiplier tubes adjacent the scintillation event generating electrical pulse signals whose amplitude varies in accordance with photomultiplier tube gain and proximity of the scintillation event;

from the pulse signals, determining a coordinate on the scintillation crystal at which each scintillation event occurs;

separating pulse signals by amplitude such that pulse signals above a preselected amplitude are counted corresponding to each coordinate to form a higher energy image and pulse signals below the preselected energy are counted corresponding to each coordinate to form a lower energy image;

subtractively combining the higher and lower energy images to generate a difference image;

determining regions of the difference image having high positive and negative count densities and selecting at least one photomultiplier tube most closely adjacent to each selected high count density region for gain adjustment;

from a number of pulse signals occurring at each of a plurality of amplitudes for the selected photomultiplier tube, determining a gain adjustment for the selected photomultiplier tube;

adjusting a gain of the selected photomultiplier tube with the gain adjustment.

15. A method of adjusting gain of photomultiplier tubes of a nuclear camera which has a scintillation crystal and a plurality of photomultiplier tubes optically coupled with the scintillation crystal, each of the photomultiplier tubes having an independently adjustable gain, the method comprising:

disposing a uniform flood source adjacent the scintillation crystal such that the scintillation crystal is irradiated with a uniform flood of radiation, radiation striking the scintillation crystal causing a scintillation event, photomultiplier tubes adjacent the scintillation event generating electrical output pulse signals whose amplitude varies in accordance with photomultiplier tube gain and proximity of the scintillation event;

from the output pulse signals, determining a coordinate on the scintillation crystal at which each scintillation event occurs;

from amplitudes of the output pulse signals and spatial coordinates at which corresponding scintillation events occur, selecting at least one photomultiplier tube for gain adjustment;

generating an energy distribution curve representing (i) a number of pulse signals versus (ii) pulse amplitude from the output pulse signals of the photomultiplier tubes;

smoothing the energy distribution curve to generate a smoothed energy distribution curve;

from the smoothed energy distribution curve, calculating a first derivative energy distribution curve;

filtering the first derivative energy distribution curve to generate a filtered first derivative energy distribution curve which emphasizes a region of interest which corresponds to a preselected pulse amplitude range;

analyzing the first derivative curve to identify a characteristic energy value adjacent a centroid of the first derivative curve in the region of interest;

comparing the characteristic energy value with a preselected energy value;

in accordance with the comparison, adjusting the gain of the selected photomultiplier tube.

16. A method of adjusting gain of photomultiplier tubes of a nuclear camera which has a scintillation crystal and a plurality of photomultiplier tubes optically coupled with the scintillation crystal, each of the photomultiplier tubes having an independently adjustable gain, the method comprising:

disposing a radiation source adjacent the scintillation crystal such that the scintillation crystal is irradiated with radiation, radiation striking the scintillation crystal causing a scintillation event, photomultiplier tubes adjacent the scintillation event generating electrical output pulse signals whose amplitude varies in accordance with photomultiplier tube gain and proximity of the scintillation event;

from the output pulse signals, determining a coordinate on the scintillation crystal at which each scintillation event occurs;

from amplitudes of the output pulse signals and spatial coordinates at which corresponding scintillation events occur, selecting at least one photomultiplier tube for gain adjustment;

from a number of output pulse signals occurring at each of a plurality of amplitudes for the selected photomultiplier tube, determining a gain adjustment for the selected photomultiplier tube;

adjusting a gain of the selected photomultiplier tube with the gain adjustment;

each time the gain of a photomultiplier tube is adjusted, recording the gain adjustment and a photomultiplier tube identification to develop a gain adjustment history.

* * * * *